United States Patent [19]
Kenney

[11] 3,884,646
[45] May 20, 1975

[54] STRUCTURAL PANEL AND METHOD OF FABRICATION THEREOF

[76] Inventor: James T. Kenney, 1675 Elevado, Arcadia, Calif. 91006

[22] Filed: Dec. 5, 1972

[21] Appl. No.: 312,381

[52] U.S. Cl. .................. 29/191.4; 29/183; 156/196; 156/229; 156/250; 52/648; 428/116; 428/119; 428/183; 428/186
[51] Int. Cl. ............................................. B32b 3/00
[58] Field of Search ....... 161/40, 41, 125, 127, 130, 161/137; 156/197, 196, 250, 254, 229; 52/648; 29/183, 194, 484

[56] References Cited
UNITED STATES PATENTS

| | | | |
|---|---|---|---|
| 2,356,675 | 8/1944 | Lachman | 52/648 |
| 2,481,046 | 9/1949 | Scurlock | 161/137 |
| 2,796,157 | 6/1957 | Ginsburg | 161/130 |
| 2,833,682 | 5/1958 | De Laszlo | 161/130 |
| 3,011,602 | 12/1961 | Ensrud et al. | 161/127 |
| 3,067,494 | 12/1962 | Spain et al. | 29/183 |
| 3,483,070 | 12/1969 | Kennedy et al. | 156/197 |
| 3,549,189 | 4/1971 | Gabo | 161/130 |
| 3,620,870 | 11/1971 | Maistre | 156/197 |
| 3,642,566 | 2/1972 | Figge | 161/127 |

FOREIGN PATENTS OR APPLICATIONS

| | | | |
|---|---|---|---|
| 1,140,540 | 12/1962 | Germany | 161/135 |

Primary Examiner—George F. Lesmes
Assistant Examiner—Paul J. Thibodeau

[57] ABSTRACT

Disclosed is an improved composite structural panel and a method of fabrication thereof.

The panel comprises a pair of structural sheets between which lie a number of substantially pyramidal structural units. The units may be skeletal and in particular may be joined together or all formed from a single piece of material such that the entire structure between the panels comprises a matrix of such units, or, in certain embodiments of the invention, a plurality of such matrices in layers, one atop the other. In any event, any number of the structural units may be securely attached to adjacent units and/or to the structural sheets, at the point of contact therebetween, thus creating a substantially rigid structural panel.

The method comprises providing such structural units, inserting them between two structural sheets and securely attaching selected units to adjacent units and to the structural sheets at the points of contact therebetween. In particular, a matrix of such structural units may be provided by creating parallel linear arrays of linear slits in a structural plate, stretching the plate in the direction perpendicular to the orientation of the arrays and raising selected portions of the plate in a direction perpendicular to the surface of the plate. A plurality of layers of structural units, for example a plurality of matrices, may be inserted between the structural sheets, one atop the other.

19 Claims, 8 Drawing Figures

STRUCTURAL PANEL AND METHOD OF FABRICATION THEREOF

BACKGROUND OF INVENTION

A. Field of Invention

This invention relates to the field of composite structural panels and the methods of fabrication thereof.

B. Description of Prior Art

A number of composite or "sandwich" structural panel design have been developed during the past 30 years, particularly in connection with aerospace applications where there is a need to produce light-weight, yet rigid structural shells. Several basic categories of composite structural panels have heretofore been employed in various applications.

Solid core panels ordinarily consist of a pair of face sheets with a core of balsa wood, plastic foam or the like, While such panels are rather inexpensive to make, reasonably rigid and reasonably light-weight, they suffer from numerous faults, such as difficulty in achieving a satisfactory bond between the face sheets and the core, because of the different materials used; low-shear strength in the panel core because of inherent weakness of the core material; and sensitivity to temperature differentials owing to differing coefficients of thermal expansion between the materials used in the core and in the face sheets.

As the name implies, honeycomb structures ordinarily comprise a pair of face sheets with paper or foil-like cores of small cells inserted therebetween. Since the cell size can be chosen as desired to prevent elastic buckling of the face sheet in compression, such a structure may give reasonably good support to the face sheets. Also, because the cells may be made relatively small, the honeycomb core can provide reasonable strength in shear. The principal difficulty with honeycomb panels is that it is very difficult to bond the core to the face sheet. Since the edge of the honeycomb which abuts a face sheet is necessarily quite thin there is too little surface contact between the core and the face sheet to provide a satisfactory bond if adhesive bonding techniques are used. Furthermore, once such a bond is created the resultant panel is subject to delamination under low load conditions, since small cracks in the glue line will propagate easily, just as a crack will ordinarily race across a sheet of glass.

Face sheets may, for special purposes, be brazed to honeycomb core, but the resultant structure will suffer from low cycle thermal fatigue. Spot welding can be employed, although this is ordinarily a very expensive process since in order to locate the correct weldment spots on the fine edge of the honeycomb core, it is necessary to insert core strips one at a time for individual welding.

Since honeycomb panels must, in order to be light-weight, be constructed with a core composed or relatively thin material, honeycomb structural panels are subject to rapid deterioration from corrosion or the like unless relatively expensive materials are used.

Corrugated core panels, constructed similary to ordinary cardboard boxes, avoid some of the problems suggested for honeycomb panels. However, corrugated core panels have relatively low strength in proportion to their weight and are, thus, undesirable for most purposes.

Finally, those composite structural panels heretofore devised which employ rods in various configurations between the face panels have proven unsatisfactory, since the thicker the the panel (i.e., the greater the distance between face sheets), the longer the rods must be and, therefore, the greater their tendency to buckle under shear, compression or tension of the panel. Furthermore, a single layer of rods between the face sheets restricts the spacing of attachment points to the face sheets and hence these arrangements do not adequately prevent buckling of the face sheets.

SUMMARY OF THE INVENTION

Accordingly, it is an object of this invention to provide a structural panel which is relatively light-weight and strong yet resistant to delamination.

It is a further object of this invention to provide a structural panel which is relatively inexpensive to fabricate.

It is a yet further object of this invention to provide a structural panel which can be fabricated from relatively inexpensive materials.

It is a still further object of this invention to provide a structural panel which is resistant to core and bond deterioration from environmental factors and age.

It is another object of this invention to provide a method of fabricating structural panels having such improved characteristics.

Briefly, the structural panel of the present invention comprises a pair of structural sheets between which are a number of structural units, each of which is of substantially pyramidal shape. For structural rigidity of the panel, the apexes of certain of these pyramidal units are rigidly attached to one of the face sheets while portions of the bases of these or other of the structural units are rigidly attached to the other sheet. In certain embodiments, many or even substantially all of the structural units are rigidly attached to their neighbors, forming a matrix of structural units which, in some cases, is formed of a single piece of material. In other embodiments, multiple layers of structural units are inserted between the face sheets to form the panel, each layer being rigidly attached to an adjacent layer or a face sheet. In each case, the individual structural units may be merely skeletal, i.e., consisting essentially of a number of edge members joined at or near the apex of the pyramid. The method of the present invention comprises providing the pair of structural sheets, inserting between them a plurality of substantially pyramidal (again, ordinarily skeletal) structural units and rigidly securing selected units to each other and/or to one or both face sheets, depending on the desired disposition of the units within the panel. In particular, a matrix of units or a plurality of matrices, may be provided and secured between the sheets by selective rigid attachment to form the panels.

DETAILED DESCRIPTION OF PREFERRED EMBODIMENTS

Figure 1:
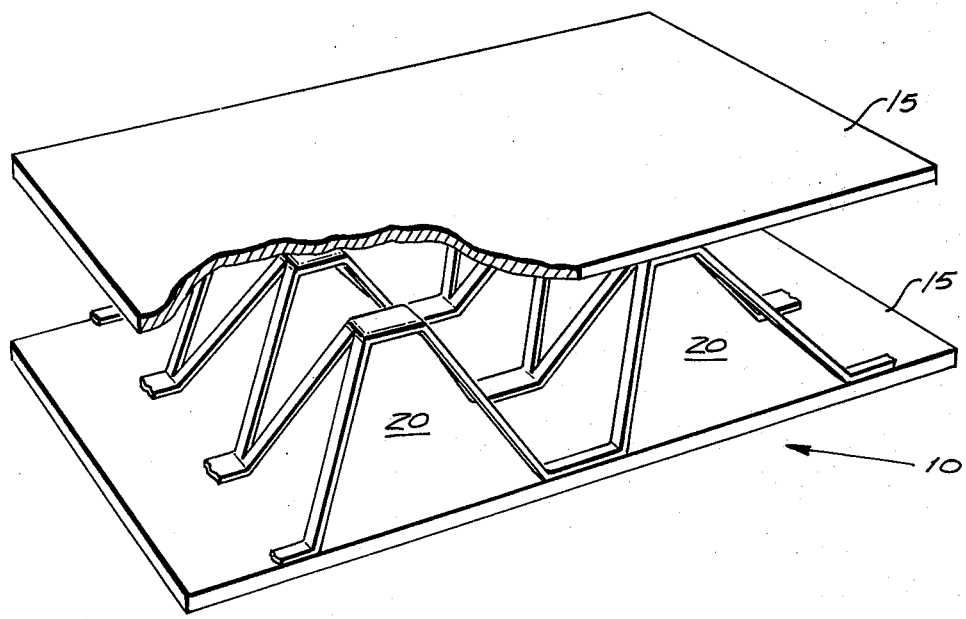
FIG. 1 is a perspective view of a portion of a structural panel made in accordance with this invention.
Figure 2:
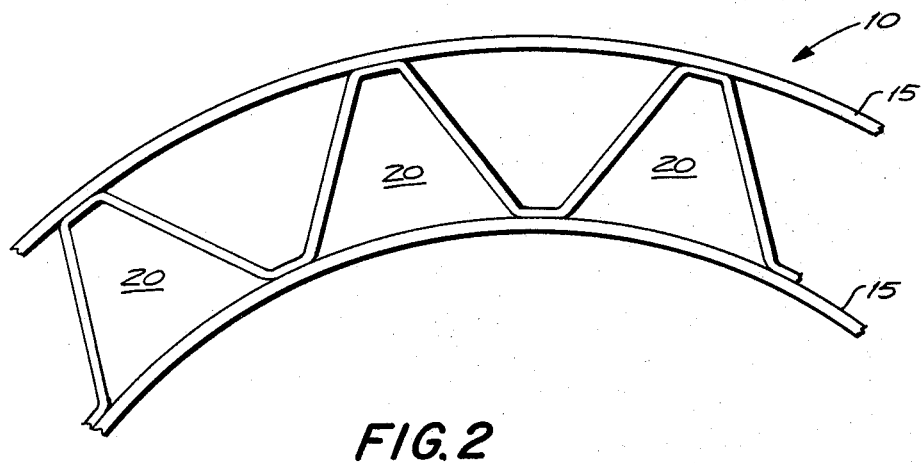
FIG. 2 is a sectional view of a portion of a structural panel of a differing configuration made according to this invention.

Referring to FIG. 1, the structural panel 10 according to an embodiment of the present invention comprises a pair of structural sheets 15 between which are a number of substantially pyramidal structural units 20. The structural panel 10 may be substantially flat, as shown in FIG. 1, curved in cross-sectional contour, as shown in FIG. 2, or any other desired shape.

Figure 3:
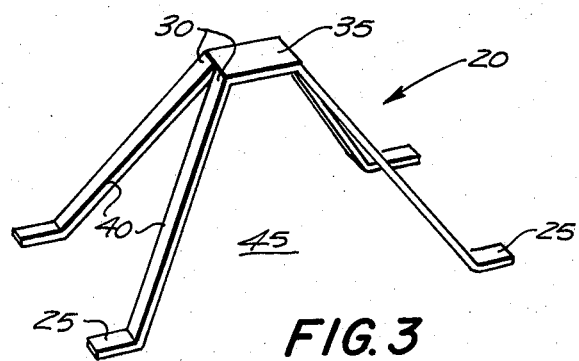
FIG. 3 is a perspective view of a structural unit in accordance with this invention.

As shown in FIG. 3, the structural units 20 are, in the preferred embodiment, skeletal, i.e., they consist merely of edge members 40 having base ends 25 and apex ends 30 meeting at the apex 35. The base ends 25 together define the base 45 of the pyramid. As is well known to those in the mechanical engineering art, these skeletal structural units are superior to nonskeletal pyramidal units (i.e., those having complete sides) of the same weight in their resistance to compressional, tensional or shear loads. Hence, although non-skeletal units may be employed without departing from the spirit of this invention, skeletal units are preferred, owing to their increased strength to weight ratio.

Figure 4:
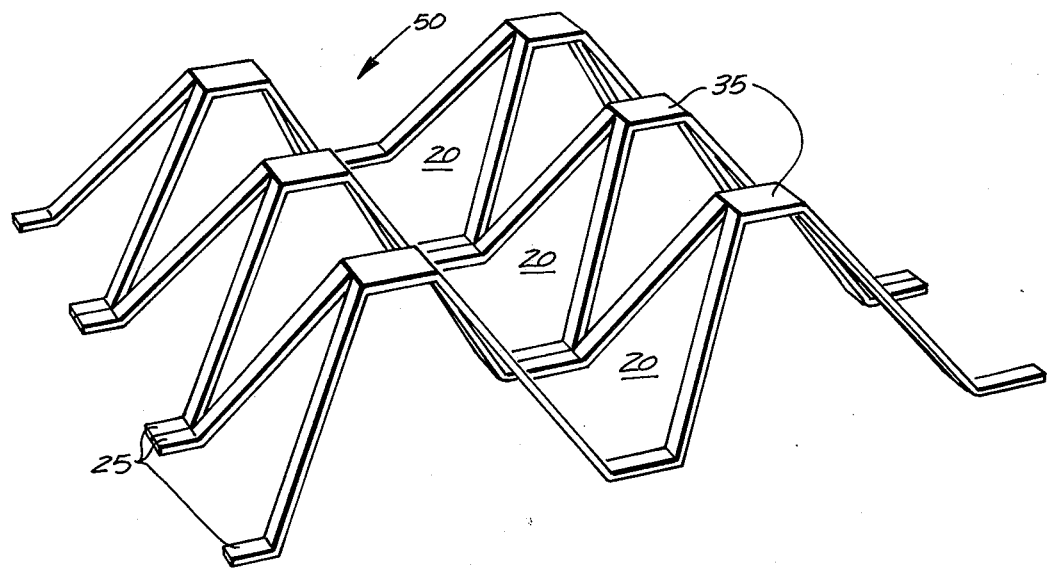
FIG. 4 is a perspective view of a portion of a matrix of structural units in accordance with this invention.

In the ordinary case, the structural panel 10 will contain numerous structural units 20, preferably spaced regularly in an array, such as in a matrix 50, as shown in FIG. 4. Selected ones of the units 20 are in contact with a face of the first structural sheet 15 and the apexes of certain ones of the units 20 are in contact with a face of the second sheet 15. If a single layer of structural units 20 intervenes between the two sheets 15, the bases 45 and apexes 35 would belong to the same units 20. However, in the preferred embodiment of this invention, a plurality of layers of structural units 20 is inserted between the sheets 15 (see FIG. 8), in which case this would not be so. In order to form a rigid structure, however, at least a group of the units 20 having their bases 45 in contact with one of the sheets 15 are rigidly attached to that sheet at the points of contact between the base ends 25 and the sheet. In addition, at least a set of the units 20 whose apexes 35 are in contact with the other sheet 15 are rigidly attached to the sheet at the points of contact. Of course, all of the units 20 in contact with one or both of the sheets 15 may be rigidly attached at the points of contact, the exact number of rigid attachment points depending on the particular application for the structural panel 10; obviously, the greater number of rigid contact points the greater the overall rigidity of the panel 10.

It is not necessary to the practice of this invention that the structural units 20 be in mutual contact or that their apexes 35 be aligned in the same direction. However, for ease of manufacture of the structural panel 10, it is preferable that all units 20 within the panel have their apexes aligned in the same direction and that they be in contact with each of their neighbors, preferably in rigid contact therewith. Such mutual rigid contact of the units 20 may be accomplished by arranging them in a regular two-dimensional array with their base ends 25 in contact with the base ends 25 of their neighbors in the array and rigidly attaching at least one base end 25 of each unit 20 to a base end 25 of one of its neighbors in the array. Such rigid attachment can be accomplished by various means, such as adhesive bonding, soldering, brazing or welding, depending on the materials chosen and the desired application for the resulting panel 10.

However, it is preferable that all structural units 20 comprise a single matrix 50 in which, except for portions of the periphery of the matrix, each base end 25 of each edge member 40 of each unit 20 within the matrix is rigidly attached to a base end 25 of an edge member 40 of at least one neighboring unit within the matrix.

In particular, the matrix 50 may be unitary structure consisting of a single piece of material. Such a unitary structure may be fabricated by the method hereinafter set forth.

Figure 8:
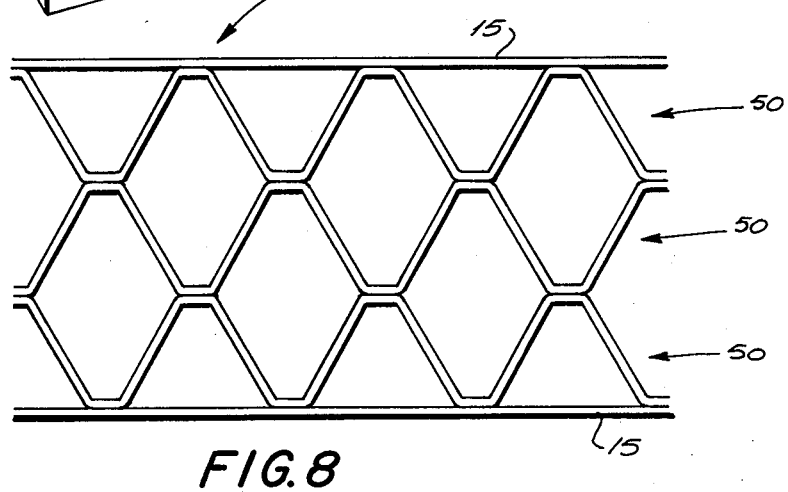
FIG. 8 is a sectional view of a portion of a structural panel according to another embodiment of the invention.

In the preferred embodiment of the present invention, the structural panel 10 may contain numerous layers of units 20. This is illustrated in FIG. 8, which shows a sectional view of a portion of a structural panel 10 having three juxtaposed matrices of structural units. In such a multi-layered panel, substantially all of the apexes 35 in one matrix 50 are in contact with the base end 25 of at least one edge member 40 of a unit 20 in the adjacent matrix. In order to provide a rigid panel 10, a plurality of these apexes 35 are in rigid contact with these base ends 25, and at least some of the units in the "top most" layer are in rigid contact with the top sheet 15, while at least some of the units in the "bottom most" layer are in rigid contact with the bottom sheet.

The sheets 15 and the structural units 20 of the structural panel 10 of this invention may be constructed of virtually any reasonably stabile material, such as various metals or plastics, wood, paper or the like. Depending on the particular application of the panel, the material comprising the sheets 15 can be selected to render them substantially rigid or flexible, the selection process being well within the skill of the ordinary mechanical engineer.

Although it is anticipated that most applications will call for a panel 10 of uniform thickness (i.e., having sheets 15 separated by a uniform distance), this can be altered by employing units 20 of varying size without departing from the spirit of this invention. In addition, in the preferred embodiment of this invention, wherein of matrices 50 in numerous layers are employed, the matrices may be of varying thickness, i.e., the height of the constituent structural units 20 of one matrix 50 may differ from that of the other(s).

Likewise, it is not necessary that the gauge of the material employed in constructing the various matrices 50 be identical. In particular, where the matrices in the panel 10 are, in the direction from one sheet 15 to the other, of successively heavier gauge material, the panel can be used effectively as a shock absorber. With such a configuration, if a blow is received by the sheet adjacent to the matrix of lightest gauge, that matrix (and perhaps nearby matrices) will absorb the energy transmitted by partially collapsing, while the remaining matrices, being of heavier gauge material, will remain intact and thus preserve the essential rigidity and structural integrity of the panel.

Furthermore, while the structural advantages of employing substantially pyramidal structural units 20 can be achieved with units having any number of edges, it will be seen that manufacture of the panel 10 is facilitated by employing one or more matrices 50 containing units 20 each having four edge members 40 the base ends 25 of which define a substantially rectangular base 45.

In its simplest aspect, the method of fabricating a structural panel according to the present invention comprises providing two structural sheets 15 composed of a metallic, plastic or other substance, whose exact nature depends on the particular requirements for the panel, and rigidly securing between these sheets a number of substantially pyramidal units 20 (preferably skeletal, as shown in FIG. 3), as hereinabove described. The units 20 are inserted between the sheets 15 so that portions of the bases 45 of selected ones are in contact with a face of one of the sheets 15 and the apexes 35 of certain ones are in contact with a face of the other sheet 15. If only one layer of structural units 20 is inserted between the sheets 15, each of the units 20 will be in contact with both sheets 15; if a plurality of layers is employed the bases 45 (i.e., the base ends 25 of the edge members 40) of the units 20 in one layer will be in contact with one sheet wile their apexes 35 will be in contact with the base ends 25 of the layer above, the apexes 35 of the ultimate layer of units 20 being in contact with the top sheet 15.

In order to provide a rigid structure, a group of the units 20 whose bases 45 are in contact with the bottom sheet 15 and a set of the units 20 whose apexes 35 are in contact with the top sheet are rigidly attached thereto at points of contact therebetween. If a plurality of layers of units 20 is employed, apexes 35 of selected units 20 in each layer which is below another layer are rigidly attached to the base ends 25 of the edge members 40 of the units 20 of the next higher layer with which they are in contact. The number and placement of rigid attachment points depends on such factors as the nature of the materials selected for the sheets 15 and the units 20, the gauge of the material selected, the size of the units 20, the number of layers of units 20 inserted between the sheets 15 and similar factors, all of which will be thoroughly understood by those skilled in the art to which this invention pertains. Clearly, a rigid attachment at every point of contact within the structural panel will create a highly rigid structure.

As is also well known to those skilled in this art, the method of rigid attachment depends primarily on the nature of the material selected and their gauges. For example, if weldable material, such as steel, is selected for the units 20 and the sheets 15, welding may be employed as the method of rigid attachment. Such materials and most other reasonably stabile construction materials, such as other metals, plastics, wood and the like, can be rigidly attached by means of adhesive bonding, for examples by the use of epoxies. Brazing, soldering, fusion and numerous other methods will be doubtless considered and perhaps employed by those skilled in the art to which this invention pertains.

As mentioned previously, it is preferable that all structural units 20 be aligned with their apexes 35 in the same orientation. It is also preferable that the layer of units 20 (or each layer of units, if a plurality is employed) be of substantially uniform thickness, so as to maintain a substantially uniform distance between the sheets 15 and, thus, create a panel 10 of substantially uniform thickness. Of course, neither of these is necessary for the practice of this invention, and those practicing it may, in certain applications, choose to depart from such configurations.

Before describing in detail the preferred method of constructing the structural units 20, it should be mentioned that they may be fabricated in any desired manner. For example, the units 20 may be individually cast from molten metal, plastic or the like. Furthermore, they may be formed by die stamping "X" — shaped structures out of a flat plate and then die-forming individual units 20. These examples are given merely to illustrate the fact that those skilled in the art may be expected to devise numerous methods of constructing the units.

Figure 7:
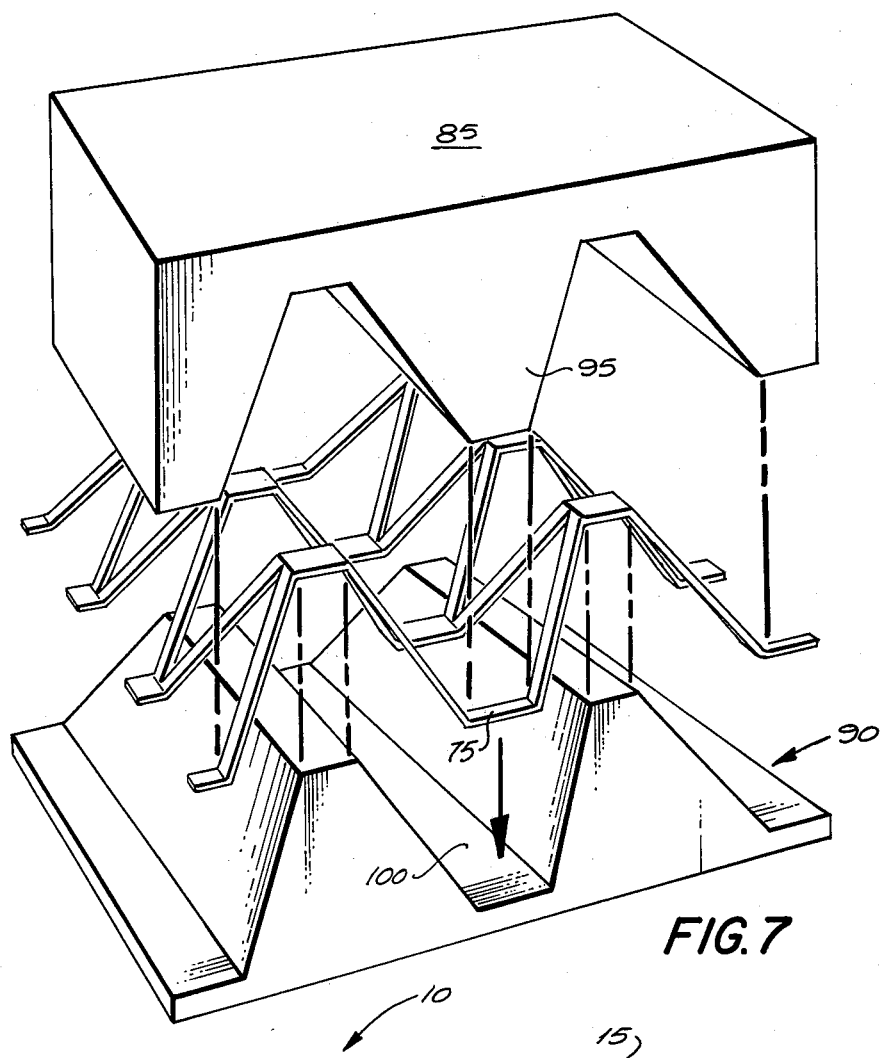
FIG. 7 is a perspective view of a pair of dies employed, in one embodiment of this invention, to convert the stretched slitted plate of FIG. 6 to the matrix of FIG. 4.

For convenience in assembly of the panel 10, a matrix 50 of units 20 is ordinarily formed prior to insertion between the sheets 15. As hereinabove described, such a matrix will consist of a regular array of units 20 with the base ends 25 of each unit within the matrix in rigid contact (for example, by welding or adhesive bonding) with a base end 25 of an edge member 40 of one or more other units 20 within the matrix 50, except for certain units 20 on the periphery of the matrix 50, these units having one or more "free" base ends. If a plurality of matrices 50 is employed, as shown in FIG. 7, successive matrices are rigidly attached to the adjacent matrices by rigid contact, as hereinabove described.

Figure 5:
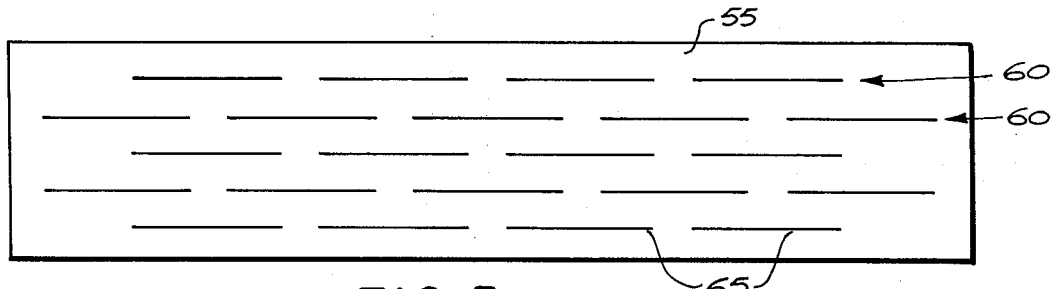
FIG. 5 is a plan view of a slitted structural plate from which the matrix of FIG. 4 may be fabricated in one embodiment of the method of this invention.

In the preferred method of the present invention, each matrix 50 is fabricated from a single piece of structural material and each unit 20 within said matrix 50 comprises four edge members 40 whose base ends 25 describe a substantially rectangular base 45. This is accomplished as follows:

The operator selects a piece of structrual plate 55 of thickness approximately equal to the desired gauge of the structural units 20 of the matrix 50 to be formed therefrom. By means of die slitting or another suitable procedure, a substantially parallel group of substantially linear arrays 60 of substantially linear slits 65 is created within the plate. As shown in FIG. 5, each array consists of substantially uniformly spaced slits 65 and intervening interstices, the orientation of the slits being the same as that of the array. Preferably, all slits within the structural plate 55 are of substantially the same length and orientation, and the distance between adjacent slits 65 within each array 60 (i.e., the width of the interstices) is substantially identical. As shown in FIG. 5, the slits 65 in alternate arrays 50 are substantially aligned in the direction perpendicular to the orientation of the arrays. Also, as shown in FIG. 5 the slits 65 in adjacent arrays 60 are staggered, i.e., the centers of the interstices between adjacent slits within an array fall at a position corresponding to the center of a slit 65 in an adjacent array.

Upon forming the arrays 60 of slits 65 in the plate 55, the operator then stretches the slitted plate in a direction parallel to the surface, but perpendicular to the orientation of the arrays 60. There are numerous methods of accomplishing this, all of which are well within the capability of a skilled machinist. Ordinarily, the extreme ends of the plate 55 will be mechanically grasped and mechanically pulled in opposite directions.

Figure 6:
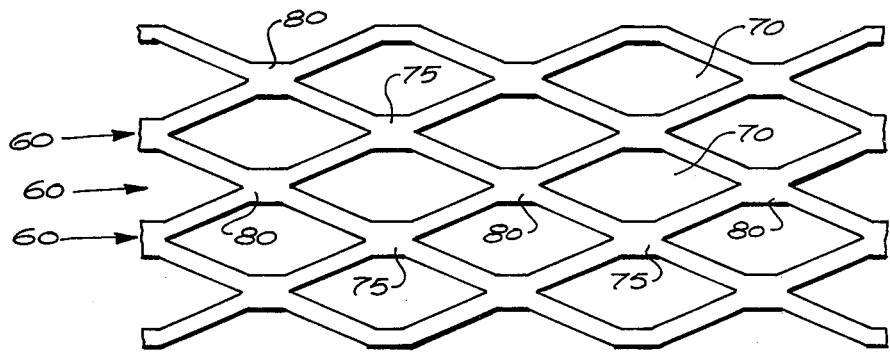
FIG. 6 is a plan view of the slitted plate of FIG. 5 after having been stretched in the direction perpendicular to the orientation of the slits, according to an embodiment of the method of this invention.

The net result is a stretched slitted plate as shown in FIG. 6, having numerous linear arrays of substantially diamond-shaped stretched slits 70. It will be seen that there are two groups of arrays of stretched slits 70 within the plate. Each group consists of those arrays, the corresponding stretched slits 70 of which are aligned, i.e., those linear arrays 60 which are separated by an odd number of intervening linear arrays 60. The other group of arrays consists of all other arrays in the plate. Obviously, the corresponding stretched slits 70 within the arrays of the other group will likewise be aligned, but a given array within the first group will be staggered with respect to adjacent arrays, which will belong to the other group.

Between the stretched slits 70 in the arrays 60 within the first group are interstices 75; interstices 80 intervene between the stretched slits 70 of the arrays in the other group.

Those skilled in this art will recognize that upon stretching the slitted plate 55, the flatness of the surface of the plate will have been lost, due to contortion of the plate material. Since surface flatness is desirable to create good bonding between the matrix 50 and the sheets 15 (or, where a plurality of matrices 50 are employed, between the matrices, also), it is desirable to restore the surface flatness of the stretched plate. This can be accomplished simply by passing the stretched plate between rollers which are in close proximity and in substantial axially parallel alignment. Softening of the stretched plate prior to rolling, e.g., by heating, will often facilitate this process, although this is not absolutely necessary.

The final step in fabricating the matrix 50 consists in extending the interstices 75 within the first group of arrays 60 of stretched slits 70, in a direction perpendicular to the surfce of the stretched plate. Referring to FIGS. 6 and 4, it can be seen that if interstices 75 are extended upward, with respect to the drawing sheet, interstices 75 will become apexes 35 of the matrix 50 and interstices 80 (of the other group of arrays) will form the base ends 25 of the units 20 of the matrix 50.

There are numerous ways of accomplishing this, the preferred method being to employ a pair of dies 85, 90, one of which 85 bears, on its "active" surface, one or more substantially triangularly prismatic protrusions 95 which are aligned perpendicularly to the linear arrays 60 and which correspond in position to the interstices 75 of the first group of arrays, while the other die 90 possesses, on its active surface, one or more substantially triangularly prismatic recesses 100 in mating relationship with the protrusions of the first die. The matrix 50 is formed by inserting the stretched slitted plate between the dies in proper alignment and forcing the dies together by ordinary means (i.e., mechanical, hydraulic, etc.). This process is, of course, facilitated if the plate is softened by heating or other means prior to insertion in the dies, although this is not absolutely necessary.

An alternative method of fabricating the matrix consists in extending the interstices 75 within the first group of arrays in one direction, perpendicular to the surface of the stretched plate, and extending the interstices 80 within the other group of arrays in the opposite direction. This can be accomplished by employing a pair of dies (not shown), one of which bears, on its active surface one or more substantially triangularly prismatic protrusions which are aligned perpendicularly to the linear arrays 60 and which correspond in position to the interstices 75 of the first group, and one or more substantially triangularly prismatic recesses, similarly aligned, corresponding in position to the interstices 80 of the other group. The other die is fabricated so as to be in substantially mating relationship with the first die. As before, the matrix 50 is formed by inserting the stretched slitted plate between the dies, in proper alignment, and forcing the dies together.

The above method applies primarily to the fabrication of matrices 50 from metallic plates 55. The process may be employed to produce matrices 50 from other materials, although in the case of relatively soft materials, such as most plastics, it is much simpler to initially create a structural plate having diamond-shaped openings (as in the stretched slitted plate described above), by simply casting the plate in that manner or die punching such openings in a flat plate. The plate having such openings can then be softened and die-formed into the matrix 50, as in the above described methods.

A plurality of such matrices may be joined by placing them in juxtaposition with the adjacent matrices, i.e., by stacking them one atop the other, such that base ends 25 are in contact with apexes 35, and joining the juxtaposed matrices 50 by rigidly securing them at selected points of contact, as thoroughly described above.

Upon rigidly attaching the structural units 20 to the sheets 15, the structural panel 10 of this invention is complete.

Such a structural panel can be seen to possess many advantages over sandwich materials heretofor employed.

For example, because the apexes 35 and the base ends 25 of the units 20 are fairly flat, a secure bond may be made between the structural units 20 and the sheets 15, and between the layers of the structural units 20, where a plurality is employed. Thus the panel of this invention may be made very strong and highly resistant to delamination.

Since the individual structural units 20 are substantially pyramidal, compressional and tensional forces are transmitted principally along the edges, thus obviating the necessity for "complete sides" of the pyramids. Accordingly, skeletal units may be employed. Thus, the panel of this invention may be made light-weight as well as strong.

Another advantage of this panel is that, since the structural units may be skeletal, conduit tubing, electrical wiring and the like may be run through the panel between the edge members 40 of the units 20. This is particularly useful in aircraft and housing applications. An additional advantage of skeletal units is that tools (e.g., welding torches) may be inserted within the panel during fabrication thereof.

The preferred method of fabricating the structural unit matrices 50, s thoroughly set forth above, permits the operator to construct the panel of this invention in a relatively inexpensive manner. In particular, large sheets of matrix 50 can be fabricated, and individual portions cut off for use as desired.

Furthermore, since the preferred skeletal pyramidal configuration of the structural units 20 provids strength with a minimum of materials, the gauge of the structural units 20 may be rather heavy without creating a panel of undue weight. The heaviness of the gauge permits the use of relatively inexpensive materials, since corrosion and other forms of environmental and age deterioration are not nearly as critical as in the case of the rather thin honeycomb cores previously employed. Thus, there is no necessity in the present invention to employ stainless steel, aluminum and other relatively expensive materials in fabricating the structural units 20.

The resistance of the structural sheets 15 to buckling increases as their thickness increases and as the distance between the points at which they are supported by the core structure decreases. Thus, if it is desired to provide relatively thick panel 10 having relatively thin structural sheets 15, it is necessary to support the structural sheets at fairly closely spaced intervals. This can be readily accomplished by employing a plurality of layers of structural units 20 according to the preferred embodiment of this invention. For example, if two layers are employed, the distance from one apex 35 to an adjacent apex 35 in the same layer will be one-half the distance that would exist between adjacent apexes 35 if a single layer of structual units 20 were employed. Thus, by practicing the preferred embodiment of this invention one may fabricate a panel 10 of a given thickness, having structural sheets 15 of a range of thickness without compromising the strength of the panel, simply by adjusting the density of support points of the structural sheets by selecting the proper number of juxtaposed layers of structural units 20 in the core.

Another advantage of the multi-layered (preferred) embodiment of this invention is that an increase in the number of layers increases the number of points within the core where rigid support can be provided. This stabilizes the individual structural units 20 and provides a stronger and more rigid core for the panel 10.

Finally, since any number of layers of structural units 20 may be employed, the length of the edge members 40 of the individual units 20 may be held to a minimum. As is well known to mechanical engineers, increasing the length of a structural member greatly diminishes its capacity to resist buckling. Thus, the present invention permits the construction of relatively thick panels which are highly resistant to compressional, tensional and shear forces, yet relatively light-weight.

Undoubtedly, those skilled in the art to which this invention pertains will recognize other advantages inherent in its practice and will be able to devise minor alterations for various specific applications without departing from the spirit of the invention as disclosed and now claimed.

I claim:

1. A structural panel, comprising:
   first and second structural sheets; and
   a plurality of skeletal pyramid-shaped structural units having an apex, a base and three or more straight rigid edge members, the apex ends of said edge members meeting one another in proximity to the apex of the unit and the base ends thereof defining the base of the unit,
   said units being sandwiched between said first and second sheets with part of said apexes rigidly attached to said first sheet and part of said bases attached to said second sheet.

2. Panel as in claim 1, wherein
   a portion of said plurality of said units are mutually disposed such that
   all units of said portion are oriented such that their apexes point toward the same one of said sheets, and
   the base end of at least one edge member of each unit of said portion is in rigid contact with the base end of an edge member of another unit of said portion.

3. Panel as in claim 2, wherein said portion is a matrix comprising a unitary structural element of expanded metal.

4. Panel as in claim 3 wherein two or more matrices are employed, each of said matrices being in juxtaposition with at least one other of said matrices, each of said matrices being disposed with respect to an adjacent matrix such that a number of the apexes within one of the pair are each in contact with the base end of at least one edge member of a unit of the other of the pair; and a plurality of said apexes are in rigid contact with said base ends at the points of contact therebetween.

5. Panel as in claim 3, wherein said units each comprise four edge members, the base ends thereof defining a rectangular plane.

6. Panel as in claim 4, wherein the material comprising the matrix adjacent to one of said structural sheets is of heavier gauge than that comprising the matrix adjacent to the other of said structural sheets.

7. Method of fabricating a structural panel comprising the steps of:
   providing first and second structural sheets;
   furnishing a plurality of skeletal pyramid-shaped structural units having an apex, a base and three or more rigid edge members, the apex ends of said edge members meeting one another at the apex of the unit and the base ends thereof defining the base of the unit;
   inserting said number of units between said sheets;
   ridigly attaching a part of said apexes to said first sheet and a part of said bases to said second sheet.

8. Method as in claim 7, wherein said step of furnishing comprises manufacturing a matrix of units substantially all of said units being mutually disposed such that the base end of each edge member of each unit within said matrix is in rigid contact with a base end of an edge member of at least one other unit within said matrix; and the remainder of said units, said remainder constituting a portion of the periphery of said matrix, being similarly disposed with respect to the other units of said matrix except that one or more of the base ends of each unit of said remainder is not in contact with the base end of any other unit of the matrix.

9. Method as in claim 8, wherein, said step of manufacturing comprises fabricating said matrix from a single piece of structural material.

10. Method as in claim 8, wherein said units each comprise four edge members, the base ends thereof substantially defining a rectangular base.

11. Method as in claim 8, wherein said step of manufacturing comprises the steps of
    fabricating two or more of said matrices;
    mutually arranging said matrices such that each of said matrices is in juxtaposition with at least one other of said matrices, each of said matrices being disposed with respect to an adjacent matrix such that a number of the apexes within one of the pair are in contact with the base end of at least one edge member of a unit of the other of the pair; and rigidly securing a plurality of said apexes to said base ends at the points of contact therebetween.

12. Method as in claim 9, wherein said step of fabricating comprises the steps of creating, in a structural plate, two or more substantially parallel, substantially linear arrays of slits, said slits and arrays aligned in substantially the same orientation, said slits being of substantially identical length and substantially uniformly spaced within their respective arrays, and said arrays being mutually disposed such that adjacent ones thereof are separated by a substantially uniform distance, such that, in a direction perpendicular to that of the arrays, corresponding slits in adjacent arrays are mutually staggered and corresponding slits in alternate arrays are mutually aligned;

stretching the slitted plate in a direction substantially perpendicular to the direction of the arrays; and extending, in a direction perpendicular to the surface of said stretched plate, the interstices between the stretched slits in each of a group of arrays, said group defined as a selected array and all other arrays mutually disposed with said selected array such that an odd number of arrays intervenes between them, substantially all of the remaining interstices in said stretched plate being caused to substantially define a plane, said extended interstices being each displaced from said substantial plane in a direction perpendicular thereto.

13. Method as in claim 12, further including the step of flattening said plate subsequently to said step of stretching and prior to said step of extending.

14. Method as in claim 12, further including subsequently to said step of extending and prior to said step of inserting, the step of joining two or more of said matrices such that each of said joined matrices is in juxtaposition with at least one other of said joined matrices, each of said joined matrices being disposed with respect to an adjacent matrix such that a number of the apexes within one of the pair are in contact with the base end of an edge member of at least one unit of the other of the pair; and a plurality of said apexes are in rigid contact with said base ends at the points of contact therebetween.

15. Method as in claim 7, wherein said sheet and said units each comprise weldable material and said step of rigidly attaching comprises welding.

16. Method as in claim 7, wherein said step of rigidly attaching comprises adhesive bonding.

17. Method as in claim 12, wherein said step of extending comprises placing said slitted stretched plate between a pair of dies, one of said dies bearing, on the surface thereof facing said plate, one or more substantially triangularly prismatic protrusions in substantially perpendicular alignment with said linear arrays and corresponding, in relative position, to the interstices of said group of arrays, and the other of said dies bearing on the surface thereof facing said plate, one or more substantially triangularly prismatic recesses, said protrusions and recesses in the two plates being arranged so as to cause the plates to lie in substantially mating relationship when brought in close mutual contact; and forcing said dies together with said plate therebetween.

18. Method as in claim 12, wherein said step of creating comprises die slitting.

19. Method as in claim 13, wherein said step of flattening comprises forcing said plate between two rollers, said rollers being in close proximity and in substantial axially parallel alignment.

* * * * *